US007529682B2

(12) United States Patent
Geller et al.

(10) Patent No.: US 7,529,682 B2
(45) Date of Patent: May 5, 2009

(54) ELECTRONIC CREDENTIALS VERIFICATION AND MANAGEMENT SYSTEM

(75) Inventors: Marilyn Grunzweig Geller, West Hills, CA (US); Jiehong Tang, Hacienda Heights, CA (US); Matthew J. Haddad, Marina del Rey, CA (US)

(73) Assignee: Medversant Technologies, LLC, Los Angeles, CA (US)

( * ) Notice: Subject to any disclaimer, the term of this patent is extended or adjusted under 35 U.S.C. 154(b) by 1091 days.

(21) Appl. No.: 10/316,821

(22) Filed: Dec. 11, 2002

(65) Prior Publication Data

US 2004/0117617 A1 Jun. 17, 2004

(51) Int. Cl.
*G06Q 99/00* (2006.01)
(52) U.S. Cl. .......................................................... 705/1
(58) Field of Classification Search ..................... 705/1
See application file for complete search history.

(56) References Cited

U.S. PATENT DOCUMENTS

| | | | |
|---|---|---|---|
| 4,553,206 A | 11/1985 | Smutek et al. | |
| 4,878,175 A | 10/1989 | Norden-Paul et al. | |
| 5,070,452 A | 12/1991 | Doyle, Jr. et al. | |
| 5,225,976 A | 7/1993 | Tawil | |
| 5,235,702 A | 8/1993 | Miller | |
| 5,301,105 A | 4/1994 | Cummings, Jr. | |
| 5,325,293 A | 6/1994 | Dorne | |
| 5,359,509 A | 10/1994 | Little et al. | |
| 5,557,514 A * | 9/1996 | Seare et al. ..................... | 705/2 |
| 5,706,441 A | 1/1998 | Lockwood | |
| 5,778,345 A | 7/1998 | McCartney | |
| 5,812,984 A | 9/1998 | Goltra | |
| 6,035,276 A * | 3/2000 | Newman et al. ................ | 705/2 |
| 6,144,959 A | 11/2000 | Anderson et al. | |
| 7,263,491 B1 * | 8/2007 | Geldermann et al. ........... | 705/1 |
| 2002/0065758 A1 * | 5/2002 | Henley ......................... | 705/37 |
| 2003/0236682 A1 * | 12/2003 | Heyer ............................ | 705/2 |

OTHER PUBLICATIONS

Computer Security update; "Medquist selects Presideo for Security Featuring Verisign."; Dec. 1, 2000.*

(Continued)

*Primary Examiner*—Jonathan Ouellette
(74) *Attorney, Agent, or Firm*—Christie, Parker & Hale, LLP.

(57) ABSTRACT

A credentials record system that creates and maintains all personnel data electronically is disclosed. The system captures personnel background data, such as license information, education and training, work experience, performance data and electronic signature at the time of entry using graphical user interfaces through a network. For example, computers with Internet connections may be used by authorized personnel to access, analyze, update and electronically annotate data even while other users are using the same record. An exemplary system may archive historical data is archived to create and record an audit trail of changes by the users. The system permits instant, sophisticated analysis of background data to identify relationships among the data, including archived data. Moreover, the system includes the capability to access reference databases for consultation regarding verification of data for accuracy on a continuous basis. The system also provides for an automated auditing process to ensure data integrity. The system may also include the capability to incorporate legacy data, such as paper files and mainframe data, for each personnel record.

36 Claims, 10 Drawing Sheets

OTHER PUBLICATIONS

PR Newswire; "CompHealth Credentialing Services Certified by National Committee for Quality Assurance" Feb. 22, 2001.*

PR Newswire; "CREDENT Receives Highest Certification from the National Committee for Quality Assurance"; Oct. 29, 2001.*

Chicago Sun-Times; "Doctor's credentials need Checking"; Howard Wolinsky; Feb. 21, 1988.*

"Will your compliance plan pass the effectiveness test?"; Lawrence A Foge; Healthcare Financial Mangement; Apr. 2000.*

PCT International Search Report dated Sep. 29, 2004, Application No. PCT/US03/39603.

Hernandez, Arthur M., "Trends in Health Care Practitioner Credentialing", Journal of Health Care Finance, Spring 1998, pp. 66-70, vol. 24:3, Aspen Publishers, Inc., U.S.

Nelson, Patricia, "Measuring the Quality of Chiropractic Alternative Care in a Managed Care Environment", Topics in Health Information Management, May 1998, pp. 39-45, vol. 18:4, Aspen Publishers, Inc., U.S.

Ruth, Linda C. et al., "Assessing Health Plan Quality", Benefits Quarterly, 1995, pp. 32-36, Second Quarter, U.S.

"MedQuist Selects Presideo for Security Featuring Versign", Worldwide Videotex, Dec. 1, 2000, vol. 1, Issue 12, Boynton Beach.

"CompHealth Credentialing Services Certified by the National Committee for Quality Assurance", PR Newswire, Feb. 22, 2001, p. 1, New York.

"CREDENT Receives Highest Certification from the National Committee for Quality Assurance", PR Newswire, Oct. 29, 2001, p. 1, New York.

"Doctors' Credentials Need Checking", Chicago Sun-Times, Feb. 21, 1988, p. 14, Chicago.

* cited by examiner

ELECTRONIC CREDENTIALS VERIFICATION AND MANAGEMENT SYSTEM

FIELD OF THE INVENTION

The present invention generally relates to electronic management systems, and more particularly, to a system for storing, continually verifying and retrieving credentials records in a global network environment.

BACKGROUND

Professionals are frequently required to be licensed and to undergo rigorous screening before practicing their profession. For example, healthcare practitioners, such as physicians, are typically required by federal, state and regulatory agencies to have a thorough background check when initially applying to hospitals, health maintenance organizations, independent physician associations and other like healthcare entities. In addition, once approved by an entity, the practitioner's background must be re-checked at periodic intervals through the course of his tenure with the healthcare entity. However, practitioner background checks create large volumes of data that must be stored, validated, analyzed and updated on a continuous basis. Such data includes at a minimum, education, training, licensure and license sanctions, work experience, malpractice insurance coverage, malpractice history and peer references.

It may be possible for professional organizations to use electronic data processing systems to automate the creation, use and maintenance of credentials in a manner that is similar to systems currently employed for the storing and management of other occupational data. However, these electronic data processing systems often do not handle data in the wide variety of data formats that may typically be used for credentials verification by healthcare entities. The wide variety of data formats for the collection of credentials information often hinders electronic processing and maintenance of practitioner files. Moreover, many professional practitioners have traditionally used paper-based forms to document their credentials information.

In addition, under current practices there may be significant duplication of credentials information. For example, within healthcare systems similar credentials information may exist in remote practitioner files located at clinics, hospitals, laboratories and physicians' offices. However, due to inefficiencies with current methods of data collection and verification, including the inability of current electronic systems to allow for the sharing of a central record of practitioner data, it is common for practitioner files at one entity to have credentials information that differs from the same practitioner files at another entity within the same system. Such differences may include missing data as well as differing experience, performance and license sanctions histories.

Further, credentials information in the practitioner files is generally not available for review by the practitioners themselves to confirm or dispute the information. Moreover, relationships among specific credentials information documented in a practitioner file such as adverse actions, gaps in work history and misstatements on the credentials application may not be apparent unless manually pulled together as a whole.

In addition, in the current environment, specific credentials information is difficult to access when needed for analysis due to its paper-based nature. Moreover, in current systems the use of a practitioner's file by one entity can preclude its simultaneous use by another entity. Under these circumstances, entities have difficulty ascertaining the fitness of their practitioners to provide services for their customers.

SUMMARY OF THE INVENTION

In one aspect of the present invention a method for electronically verifying information includes requesting credentials information from applicants in a plurality of formats, collecting received credentials information from the applicants in a common format through an interface to a global network, storing collected credentials information in a dynamic database and verifying collected credentials information with external sources through an electronic interface.

BRIEF DESCRIPTION OF THE DRAWINGS

The present invention will become better understood with regard to the following description, appended claims, and accompanying drawings, in which:

DETAILED DESCRIPTION OF THE INVENTION

An exemplary embodiment of a web based credentials acquisition, storage, verification and audit system (WebCVO) automates and simplifies existing methods of credentials information collection, verification, audit, maintenance and retrieval. In contrast to other systems, the described exemplary embodiment creates and maintains all credentials information electronically and thus can eliminate or supplement the creation and maintenance of physical data records. An exemplary WebCVO may further provide an intuitive, easyto-use, web-based interface that allows users to capture and analyze credentials information quickly and efficiently. In accordance with an exemplary embodiment, credentials information may be entered into the electronic credentials system from paper-based forms or may be imported from electronic storage devices (diskette, CD-ROM, tape or the like). Alternatively, credentials information may also be scanned in through the use of a teleform or directly entered by a practitioner into the WebCVO system.

In addition, the described exemplary WebCVO system may include the capability to manage and report on a wide variety of credentials information formats, including credentials information from external sources, such as licensing organizations and governmental databases. In accordance with an exemplary embodiment, the WebCVO system may continuously access external sources to validate current credentials information. The WebCVO system may then alert the practitioner and all entities to which that practitioner is assigned of any information not validated by an external source and to information reported by the source but not recorded in the practitioner's credentials record.

The described exemplary WebCVO system may also prompt practitioners to renew credentials information prior to the expiration of that information. In addition, an exemplary WebCVO system can also incorporate a practitioner's legacy data, such as quality information, into the practitioner record as well as legacy data from mainframe computers.

Figure 1:
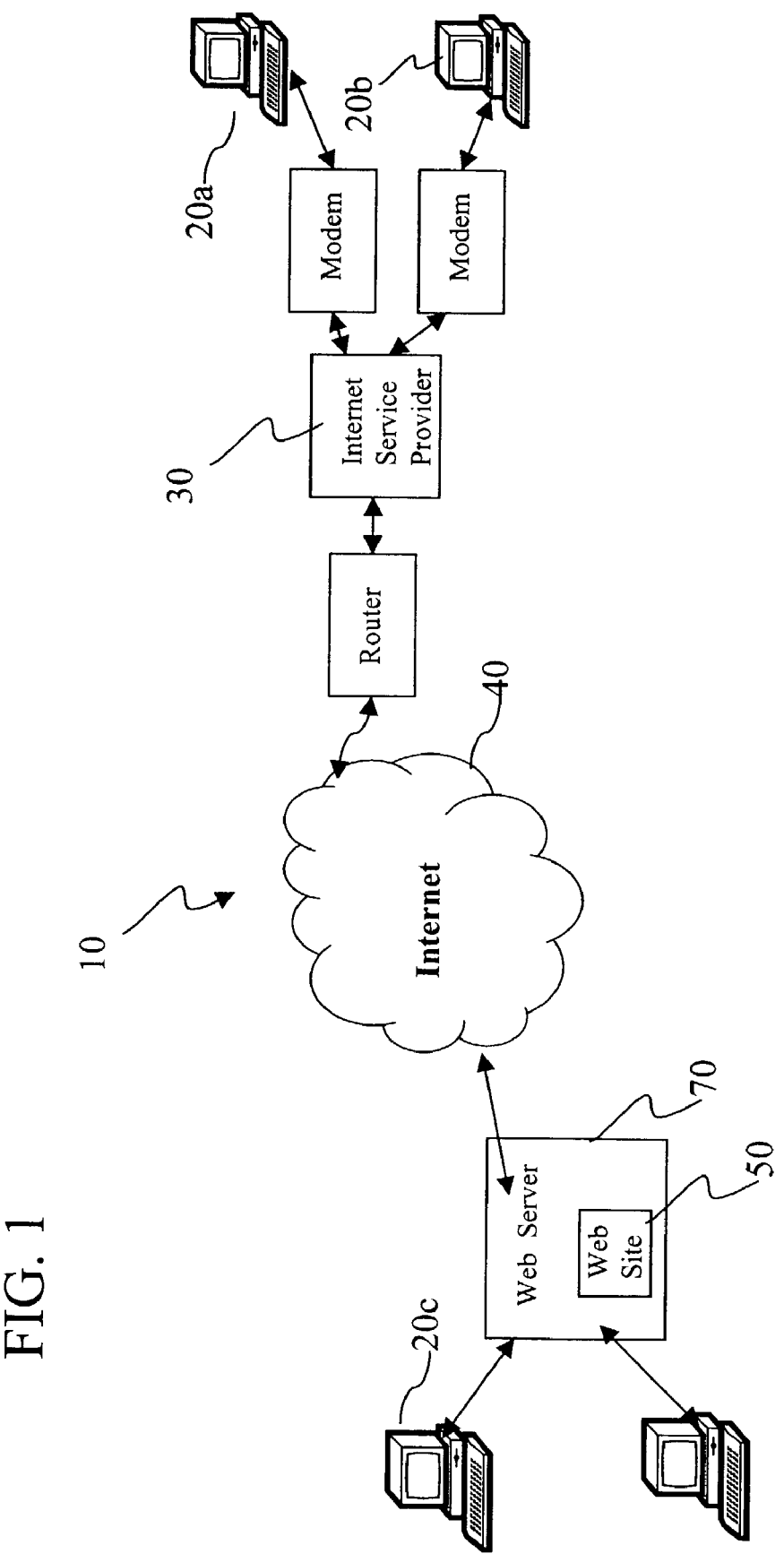
FIG. 1 is a simplified block diagram of an electronic credentials verification system in accordance with an exemplary embodiment of the present invention.

FIG. 1 illustrates an exemplary electronic credentials system 10. The described exemplary electronic credentials system 10 includes multiple remote devices 20a and 20b coupled to one or more web servers 30 through a remote communication network 40. The communication network may refer to a network or combination of networks spanning any geographical area, such as a local area network, wide area network, regional network, national network, and/or global network. The Internet is an example of a current global computer network. In addition, the communication network may be a hardwire network, wireless network, or a combination of hardwire and wireless networks.

Hardwire networks may include, for example, fiber optic lines, cable lines, ISDN lines, copper lines, etc. Wireless networks may include, for example, cellular systems, personal communications service (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

The remote devices 20a-20b may be general purpose computing devices that allow users to remotely communicate with the web server over the communication network 40. The computing devices may be any processor controlled device that permits access to the communication network, including terminal devices, such as personal computers, workstations, servers, clients, mini-computers, main-frame computers, laptop computers, a network of individual computers, mobile computers, palm-top computers, hand-held computers, set top boxes for a television, other types of web enabled televisions, interactive kiosks, personal digital assistants, interactive or web enabled wireless communications devices, mobile web browsers, or a combination thereof.

The computers may comprise one or more input devices such as a keyboard, mouse, touch pad, joystick, pen input pad, and the like. The computers may also possess an output device, such as a visual display and an audio output. One or more of these computing devices may form a computing environment.

An exemplary web server 70 preferably hosts a website 50 comprising one or more interrelated web page files and other files and programs. The files and programs may be accessed via a communications network 40 such as the Internet, by sending for example, a hypertext transfer protocol (HTTP) request specifying a uniform resource locator (URL) that identifies the location of one of said web page files, wherein the files and programs are owned, managed or authorized by a single entity. Such files and programs can include, for example, hypertext markup language (HTML) files, common gateway interface (CGI) files, and Java applications.

In an exemplary embodiment, the web page files preferably include a home page file that corresponds to a home page of the website. The home page can serve as a gateway or access point to the remaining files and programs contained within the website. In one embodiment, all of the files and programs may be located under, and accessible within, the same network domain as the home page file. Alternatively, the files and programs can be located and accessible through several different network domains.

The described exemplary website may use encryption technology such as for example secure socket layer (SSL) encryption and digital certificates to maintain the integrity and confidentiality of electronic transmissions to and from the Web server 70. In the described exemplary embodiment message data is encrypted using a randomly generated key that is further encrypted using the recipient's public key. This is referred to as the "digital envelope" of the message which is sent to the recipient with the encrypted message. The recipient decrypts the digital envelope using a private key and then uses the symmetric key to unlock the original message.

Figure 2:
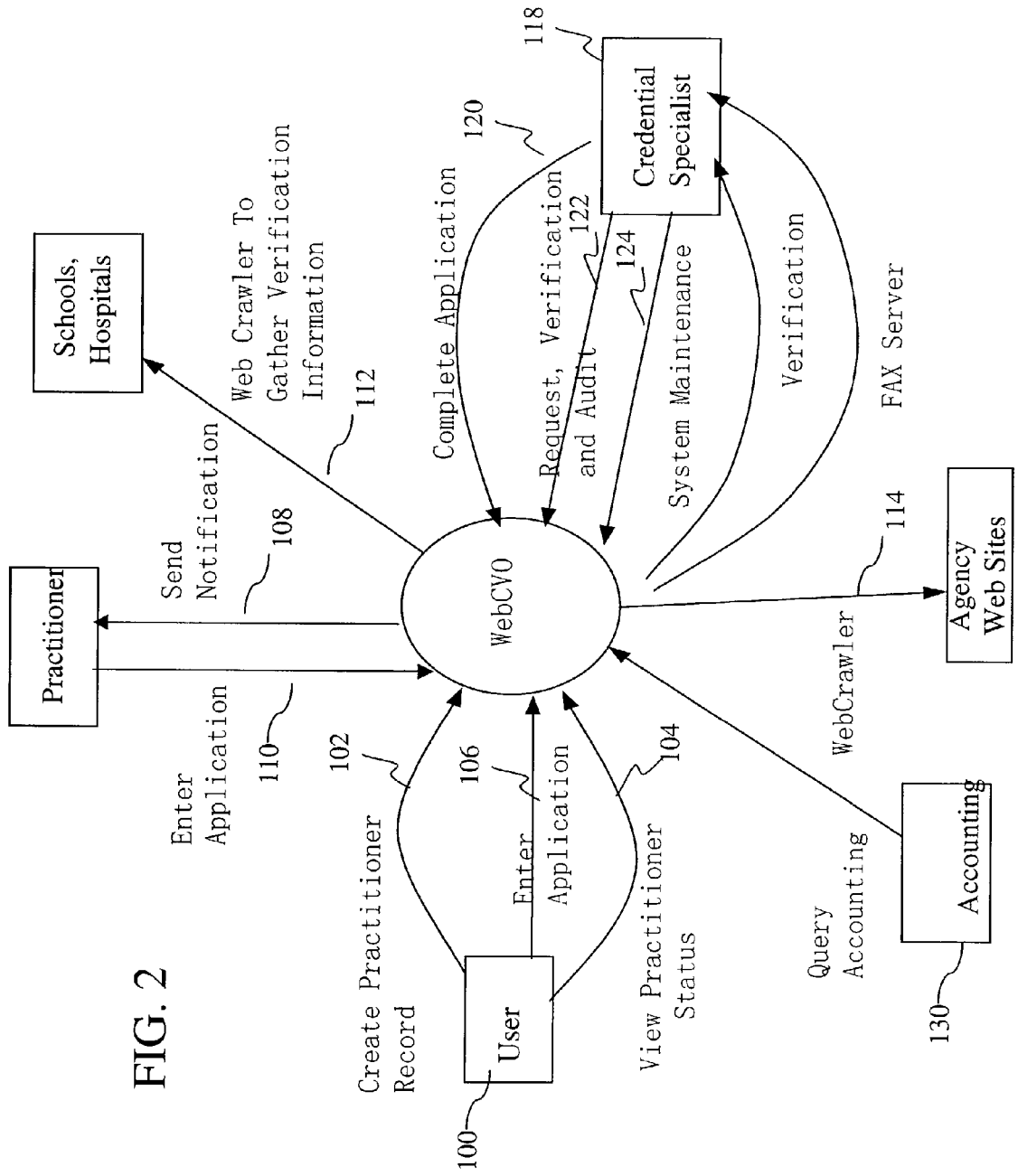
FIG. 2 is a graphical illustration of the relationship of the applicant, client, electronic verification sources and non-electronic verification sources in accordance with an exemplary embodiment of the present invention.

FIG. 2 graphically illustrates the relationship of the practitioner, client, electronic verification sources and non-electronic verification sources within an exemplary electronic credentials system. The described exemplary electronic credentials system gives users considerable freedom to manage, maintain and utilize the functionality of the system. For example, users 100 can create new practitioner accounts 102 including a credentials application which a practitioner may then complete. In an exemplary embodiment, the system may automatically send a notification 108 to the practitioner preferably instructing the practitioner to log on to the system and input his credentials information 110.

An exemplary system may send the notification by any of a number of conventional means, such as by email, fax, letter or a combination thereof. In one embodiment an exemplary system may assign a contact method based upon the practitioner's preference for receiving credentials information requests. Further, an exemplary system may automatically send an email to practitioners which includes instructions on how to access the credentials system electronically (e.g. online) as well as requests for the updating or clarifying of credentials information. An exemplary system may compare existing data to newly entered data and archive existing data to a history table.

In one embodiment, the electronic credentials system p may automatically forward a fax with instructions for online access or instructions for receiving a blank credentials application via Internet download, fax or mail to a practitioner. The described exemplary electronic credentials system may also automatically fax or print for mailing complete credentials packages, including instructions and application materials. The described exemplary system may also automatically contact practitioners opting to complete a paper application via fax or letter generation for the completion, update and clarification of their credentials.

In one embodiment a user may also view the status of an existing practitioners 104 credential application or re-verification, plan committee and continuing education meetings and create customized pages for their own use 106. In addition, the described exemplary system may identify verification requirements for a particular practitioner including the parameters for handling adverse information. The described exemplary system may then automatically contact various entities such as, for example, schools, hospitals, or peers to request verification information 112, via for example, a web crawler, link, or other conventional method of querying a database.

For example, in an online verification system an encrypted request for verification may be included as parameters on an HTTPS query string to verification sites. In one embodiment the request may further include payment of a verification fee. The described exemplary system may also auto-generate email, fax or letter requests to non-electronic verification sources including payment of verification fees.

An exemplary system may send requests for verification information by fax, letter or email (if choose by phone, an exemplary system may schedule phone calls for WebCVO credentials specialists). An exemplary system may also automatically check the websites of all government agencies (for example, via a web crawler, link or other conventional method of querying a database), or other regulatory bodies for information related to the practitioner's credentials 114. In addition, an exemplary system may make follow-up requests for verification information according to a pre-set schedule.

The described exemplary system may compare the verification information received from external sources to the credentials information submitted by the applicant. An exemplary system may then auto-update the database with matched information or manually update the database through the use of electronic work prompts or ticklers.

For example, in an exemplary embodiment, a credentials specialist 118 may compile the responses to the requests for verification information and perform various other tasks to complete the application process 120. A credentials specialist may then utilize a fax server or other similar means to verify and audit the practitioner information 122.

In an exemplary embodiment, the received verification information may be archived in an online data repository, allowing web access and tracking. For example, in the described exemplary embodiment, electronic information received from verification sites may be stored as digital images in an applicants database. Similarly, verification information received from non-electronic sources may be scanned and stored as scanned images. The described exemplary system may further comprise an accounting component that tracks all individual itemized charges in accordance with particular contract requirements 130.

An exemplary embodiment of the present invention may also provide instant access to a practitioner's electronic credentials record by authorized entities from any geographic location. For example, the described exemplary system may provide authorized entities to access and update practitioner files using, for example, the Internet. To enable complete replacement of physical records, the present invention permits practitioners to electronically annotate practitioner data. Thus, a practitioner can enter and update credentials information, acknowledge that he or she has reviewed posted credentials information. A practitioner may also provide explanations for any information not validated by an external source or for information reported by a source, not currently posted to the practitioner's record, all by electronically annotating a practitioner's record.

Figure 3:
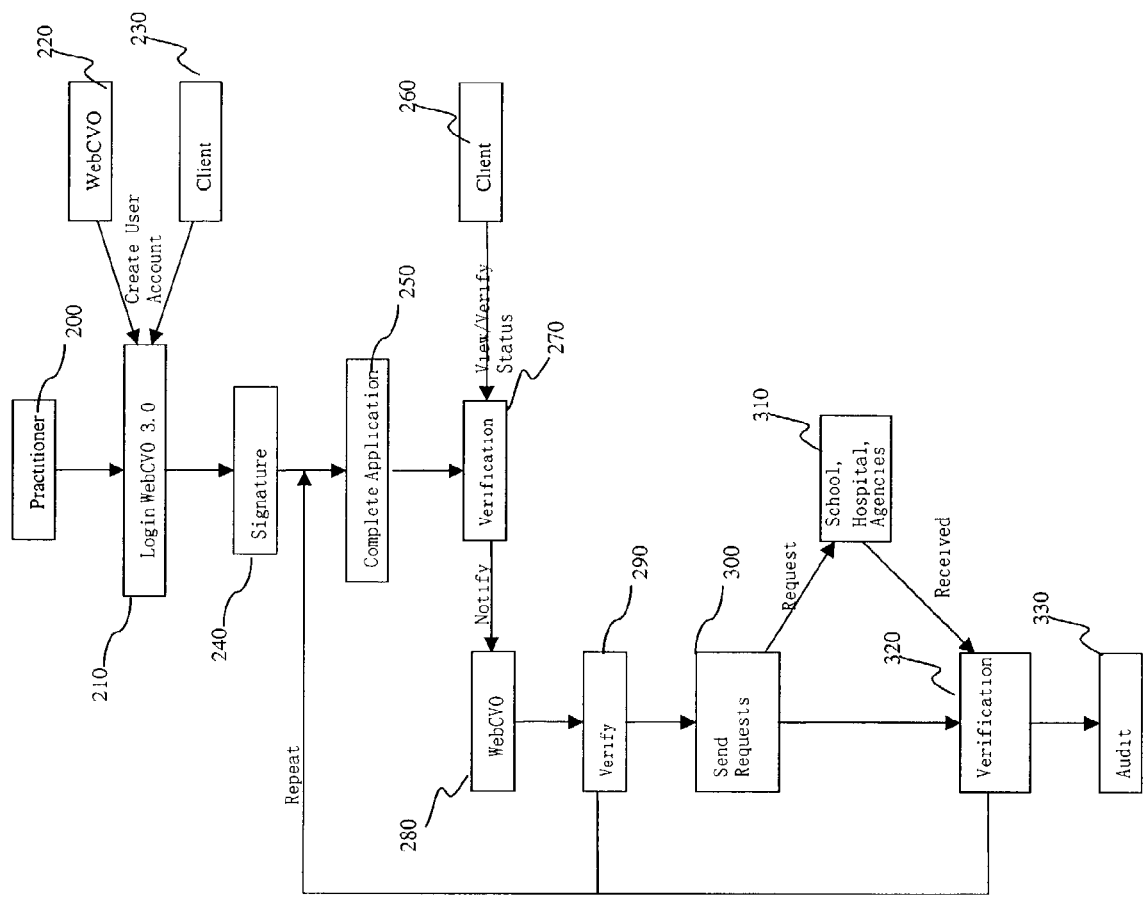
FIG. 3 graphically illustrates the logic flow of an electronic credentialing process in accordance with an exemplary embodiment of the present invention.

For example, FIG. 3 graphically illustrates the logic flow of an exemplary credentialing process. In one embodiment practitioners 200 may logon to the described exemplary electronically credentialing system 210 and view their own credentials information online. In addition, in an exemplary embodiment the organizations which collect and verify submitted credentials applications may also remotely logon to the system via a global computer network, such as, for example the Internet 220. In addition, organizations that outsource this responsibility to another organization such as for example, health plans, health systems, hospitals, managed services organizations, preferred provider organizations, medical groups, and independent practice associations may also be provided remote access to the described exemplary system 230.

The described exemplary system may grant different types of users varying degrees of access to the WebCVO system. In one embodiment the described exemplary system may utilize assigned login IDs and passwords to redirect users to different web pages for different functionalities. In addition, an exemplary system may sign each practitioner record with an electronic signature 240. This signature may be captured either through electronic creation by the practitioner or by the scanning of a practitioner's actual signature.

An exemplary system may require practitioners to complete all mandatory data fields before submitting a credentials application for verification 250. An exemplary embodiment of the present invention allows for the assigning of required data fields by practitioner type and verification phase. For example, in one embodiment practitioners may be required to complete a set of data fields pertinent to their field of practice. Practitioners may also be required to complete an initial set of data fields (also pertinent to their field of practice) and upon satisfactory verification of those fields, the practitioner may then be required to complete a secondary, tertiary, etc. set of data fields. In accordance with an exemplary embodiment the required fields are assigned when a practitioner's record is created.

In addition, for applications submitted online, the organization performing credentials verification may view the application and approve it for verification initiation 260. In practice the described exemplary system may automatically initiate the verification process 270 for submitted applications that are approved for verification 280.

The described exemplary system may retrieve electronic data from primary source verification websites 290. The described exemplary system may send requests to non-electronic data sources via email, letter or fax, (or phone) including a copy of a release from the corresponding practitioner with electronic signature and delineation of privileges, if desired 300.

An exemplary system may correlate the verification information received from external sources with the credentials information entered by the applicant. The described exemplary system may auto-update the database for matched data. In addition, in one embodiment the described exemplary system may attempt to identify reasons for a mismatch between the verification data received from external sources and the credentials information entered by the applicant.

For example, the system may electronically or manually attempt to identify clerical errors, such as typographical errors that may occur during the conversion of a scanned document to text by an optical character recognition program. The system may then request that the applicant provide an explanation for any data mismatches that cannot be attributed to errors in the data entry or correlation process. An exemplary system may then verify newly entered data by correlating it with the verification information received from the external sources.

In one embodiment, the system may automatically track the receipt of verification information and may automatically re-send verification requests if information is not received. In an exemplary embodiment, time frame intervals for the re-sending of verification requests are determined by the verifying organization. Further, non-responsive sources may be routed to an electronic tickler program for distribution to and follow up by credentials staff.

Non-electronic data sources may return requested verifications through email, fax, letter or the like 310. The described exemplary system may route information received from non-electronic sources to an electronic work tickler for distribution to and verification by credentials staff 320. Alternatively, if the verification information is received via teleform it may be auto updated to the database.

In addition, an exemplary system may route mismatched data as well as matched data to an electronic tickler for distribution to and manual verification by credentials staff 290. In addition, in one embodiment, the described exemplary system may route practitioner information to an audit program to confirm verification was performed correctly 330. The described exemplary system may utilize a single, double or triple audit process.

Figure 4:
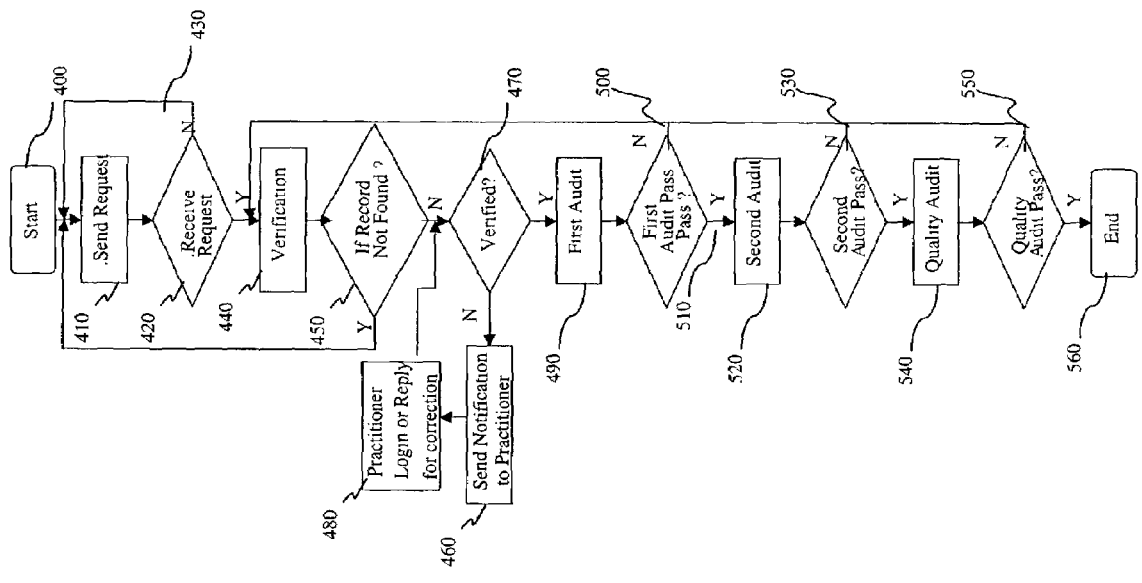
FIG. 4 is a flow chart illustrating an audit process for the verification of credentials information in accordance with an exemplary embodiment of the present invention.

For example, FIG. 4 graphically illustrates an exemplary triple audit process. In operation, the described exemplary system may manually or automatically send requests to verifying sources 410 in response to a verification request from a credentialing organization 400. In one embodiment the system may mark information received in response to verification requests for verification 420. Otherwise the system may automatically send another request to the verifying sources in accordance with preset time intervals until the requested verification information is received 430. If a response to the request is not received the system may route the information to an electronic work distribution and reminder program for processing by the credentialing organization.

In practice the credentialing organization or the WebCVO verifies information received from the verifying source 440. If a verifying source responds with a "Record Not Found" response 450, the described exemplary system may notify the practitioner via email, fax or letter 460 and ask for corrected information. The practitioner may then respond with corrected information 480 and the system may then send another request to the verifying source 410 with corrected information.

The described exemplary system may route verified credentialing information to an electronic work distribution program for auditor review 490. In one embodiment, the auditor reviews the verification information received to ensure that it matches that reported on the practitioner's credentials application. If the verification information received matches that reported by the practitioner, the auditor marks the audit as "Pass." In the event the verification information received does not match that reported by the practitioner, the auditor marks the audit as "Fail."

Should the auditor mark the first audit as failed 500, the original verification is archived and the verification and audit processes are re-initiated. Should the auditor mark the first audit as passed 510, credentialing information is routed to an electronic work tickler for second auditor review 520. Should the auditor mark the second audit as failed 530, the original verification is archived and the verification and audit processes are re-initiated.

In one embodiment, the system may route information that passes two consecutive verification audits to an electronic work distribution program for quality audit review of all verifications 540. Should the auditor mark the quality audit as failed 550, the original verification is archived and the verification and audit processes are re-initiated, otherwise the verification audit has been successfully completed 560.

The described exemplary electronic credentials verification system preferably supports a plurality of data methods of credentials information input. For example, in one embodiment an applicant may enter credentials information from a global computer network such as, for example, the Internet. Alternatively, credentials information may also be imported from a variety of sources such as, for example, a CD-ROM, teleform that is scanned in using optical character recognition, etc. In an exemplary embodiment, the system may require the applicant to provide complete information by continually contacting the applicant via email, fax, letter or a combination thereof until all information is complete.

Figure 5:
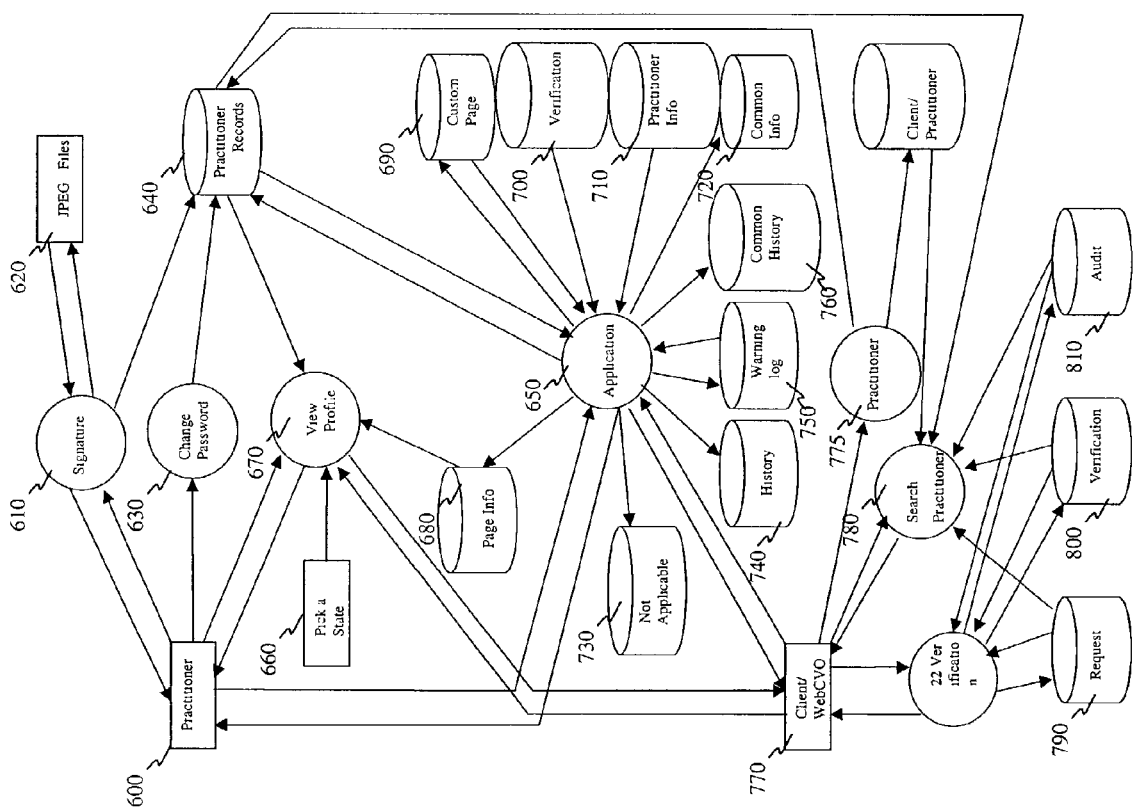
FIG. 5 graphically illustrates an online electronic verification process in accordance with an exemplary embodiment of the present invention.

FIG. 5 graphically illustrates an exemplary online credentials application process. For online application submissions, the described exemplary system may automatically or manually assign a login ID and password to a practitioner 600 for system access. In an exemplary process, a practitioner must review and accept an information release agreement and create a signature 610 after logon to the system. The described exemplary system may capture a scanned signature or an electronic signature for each practitioner and may digitally convert the captured signature to a globally unique identifier (GUID). In one embodiment, a scanned in signature may be saved in JPEG format 620.

In an exemplary embodiment, the system records the user identification and date and time for each piece of data entered and any and all subsequent changes to provide a complete audit trail for credentials information entered into the system. In this manner, the system transforms a practitioner's credentials application from a static record into a dynamic, real-time comprehensive record that may be linked to enterprise-wide databases to capture or supplement other practitioner data.

In one embodiment, the system may prompt the practitioner to change his or her password 630 and may create a practitioner record by selecting from a set of required data fields that are pertinent to the practitioner's field of practice as well as an initial set of required data fields (also known as a pre-application). When the pre-application is verified an exemplary system may require the practitioner to complete a secondary, tertiary, etc. set of required data fields. An exemplary embodiment of the present invention may also support the creation of practitioner records having additional data fields that are not included in the standard applications stored in the credentials information applications repository 650.

In the described exemplary embodiment, a practitioner may select credentials applications by state from the application library 660. In one embodiment, a practitioner may retrieve and view the selected credentials application 670 which is populated with the specific information entered by the practitioner 680.

The credentials application 650 may comprise a variety of user defined custom pages 690, the results of the verification processes 700, as well as additional practitioner data input through modification 710. An exemplary credentials application may further comprise common data information 720 such as information received from insurance carriers, schools, hospitals, government agencies, etc. The application may also include pages (tabs) that may be marked as not applicable to the particular practitioner 730, as well as archived data 740, a warning log comprised of data mismatches and identified adverse actions 750 and common field level history tracking data 760.

In one embodiment the application may be composed of elements that conform to a standardized programming language such as, for example, the extensible markup language (XML) specification. As is known in the art, XML is a markup language for documents containing structured information. Structured information contains both content (words, pictures, etc.) and some indication of what function that content performs. The utilization of a standardized programming language further promotes the automatic utilization of the credentials information across enterprise-wide databases to capture or supplement other practitioner data In one embodiment organizations 770 may have access to practitioner applications 775 and practitioner 775 records 640. An organization may also search practitioners in the system 780 to retrieve and review requested information 790, verification information 800 and audit information 810. Organizations may also access practitioner verification information to view the status and detailed information 820.

Figure 6:
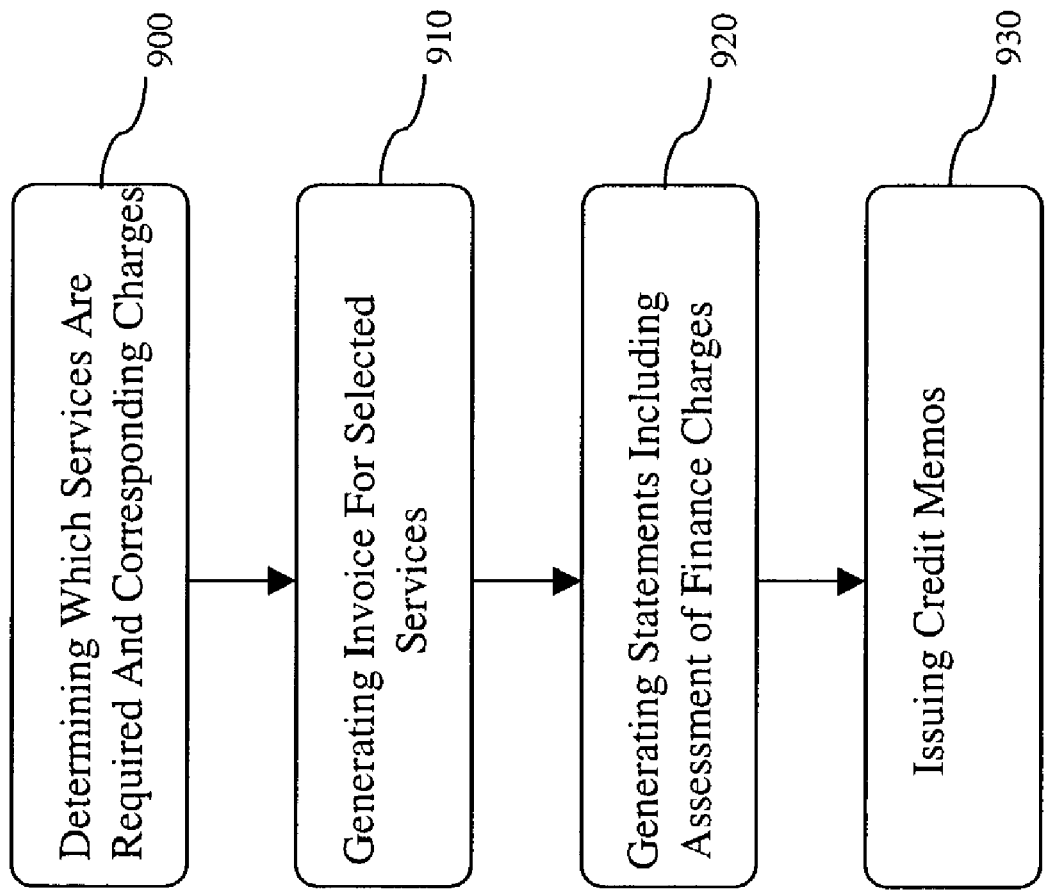
FIG. 6 graphically illustrates a process for creating and maintaining accounting records associated with the verification of credentials information in accordance with an exemplary embodiment of the present invention.

Referring to FIG. 6, an exemplary embodiment of the present invention may create and maintain accounting records associated with the verification of credentials information. For example, the described exemplary system may determine which services are required for a particular client as well as the charges associated with those services 900. The described exemplary embodiment may then automatically generate an invoice for the appropriate services when they are performed. 910. The system may also generate accounting statements in accordance with the appropriate services including assessments of finance charges where appropriate 920. The system may then automatically issue credit memos 930 from the accounting statements 930.

Figure 7:
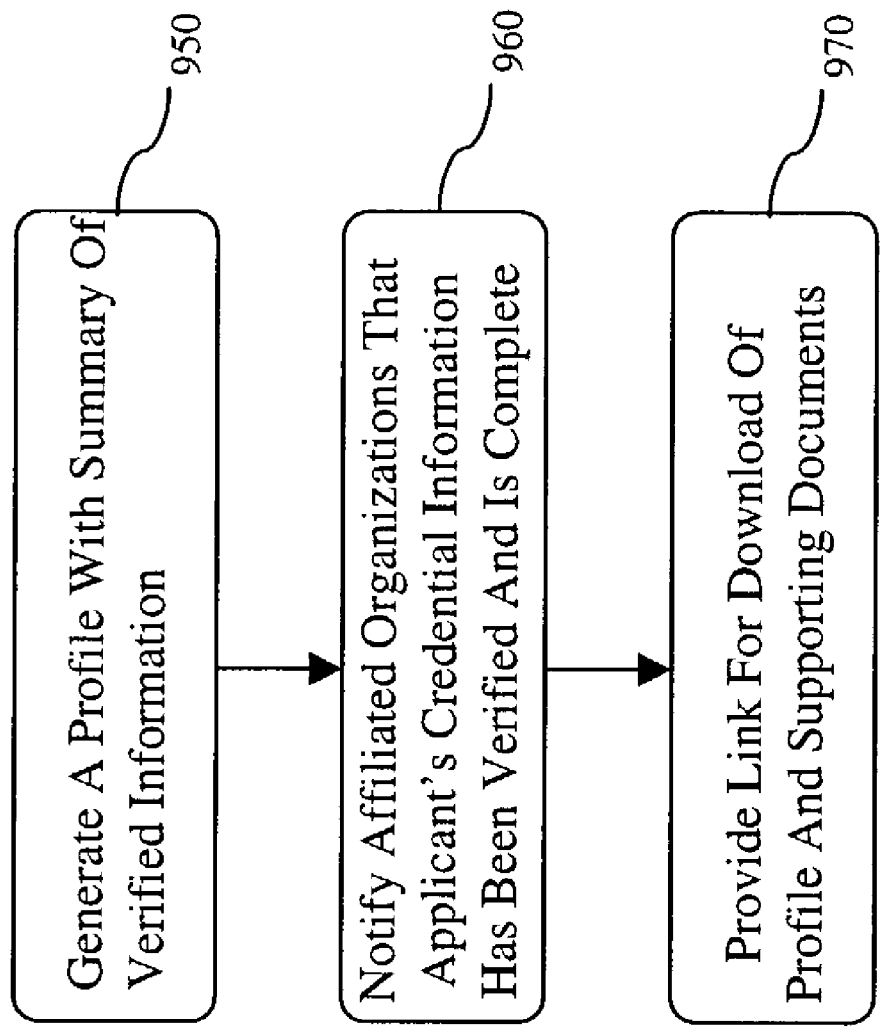
FIG. 7 graphically illustrates a process for generating verified credentials profile information including copies of records from external sources in accordance with an exemplary embodiment of the present invention.

Referring to FIG. 7, an exemplary embodiment of the present invention may also generate verified credentials profile information including copies of all records from external sources. For example, in one embodiment, the described exemplary system may generate a profile with a synopsis of verified information as required by regulatory agencies within the field of practice of the applicant 950. The describe exemplary system may also notify affiliated organizations that the applicant's credentials information has been verified or re-verified and is complete. The system may also provide a hyperlink 970 to a site from which interested parties may download the verified credentials profile. The system may further make copies of the electronic and scanned documents utilized in the verification process available for download as well.

Figure 8:
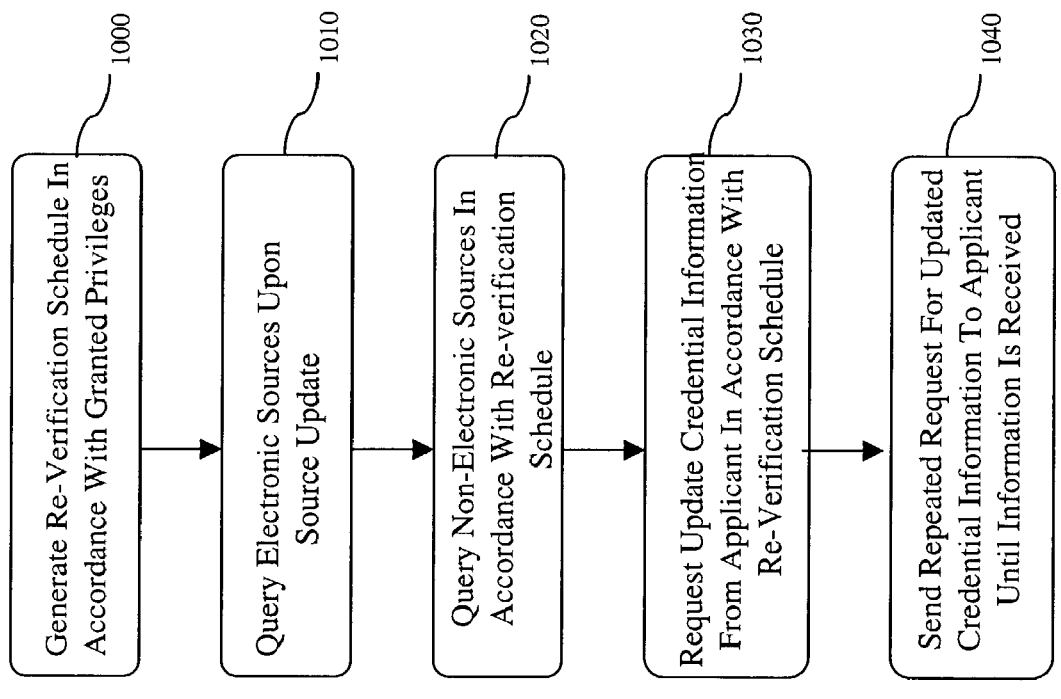
FIG. 8 graphically illustrates a process for creating and maintaining a continuous calendar of re-verification of an applicant's credentials in accordance with an exemplary embodiment of the present invention.

Referring to FIG. 8 an exemplary embodiment of the present invention may also create and maintain a continuous calendar of re-verification of an applicant's credentials information. For example, an exemplary system may create a re-verification schedule in accordance with the requirements for re-verification for a particular set of privileges 1000. The described exemplary system may then query electronic sources 1010 and non-electronic sources in accordance with the prescribed schedule 1020. The described exemplary system may also request that the applicant update credentials information on a prescribed schedule 1030 and continually send repeated requests for updated information until the requested information is received 1040.

Figure 9:
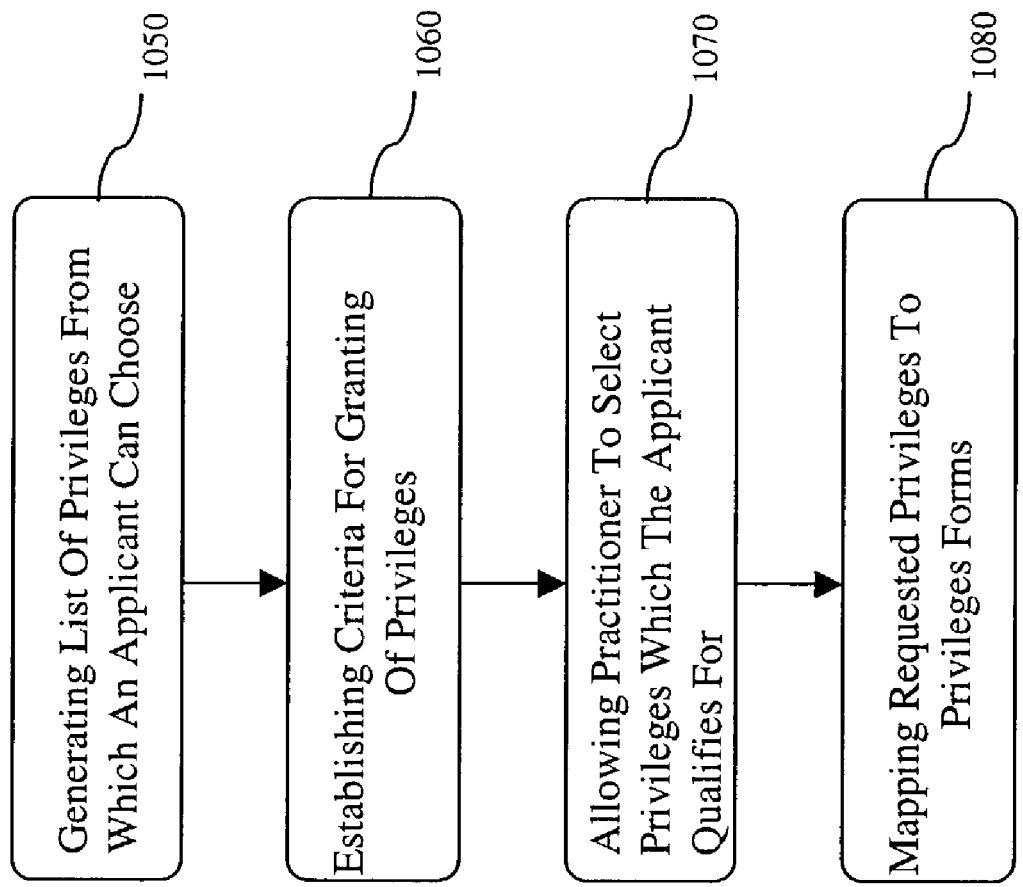
FIG. 9 graphically illustrates a process for allowing applicants to request privileges based upon analysis of credentials information in accordance with an exemplary embodiment of the present invention.

Referring to FIG. 9 an exemplary embodiment of the present invention may also allow applicants to request privileges based upon analysis of credentials information. For example an exemplary system may generate a list of privileges from which a practitioner in a particular field may select 1050. The described exemplary system may then establish criteria such as, for example, level of education, training and experience for the granting of each privilege 1060. The system may then compare the applicant's credentials with the required criteria and restrict the privileges which the applicant may select from to those for which the applicant has satisfied the specified criteria 1070. The system may then map the requested privileges to appropriate privileges forms 1080 which may then be automatically sent via email, fax or letter to external sources for review of competence.

In an online system, a "pop up" message may be generated when an applicant attempts to select a privilege which the applicant does not qualify for. The pop message may provide the reasons for privilege ineligibility. Alternatively, an exemplary system may auto-generate an email, fax or letter to the applicant that provides the reasons for privilege(s) ineligibility.

Figure 10:
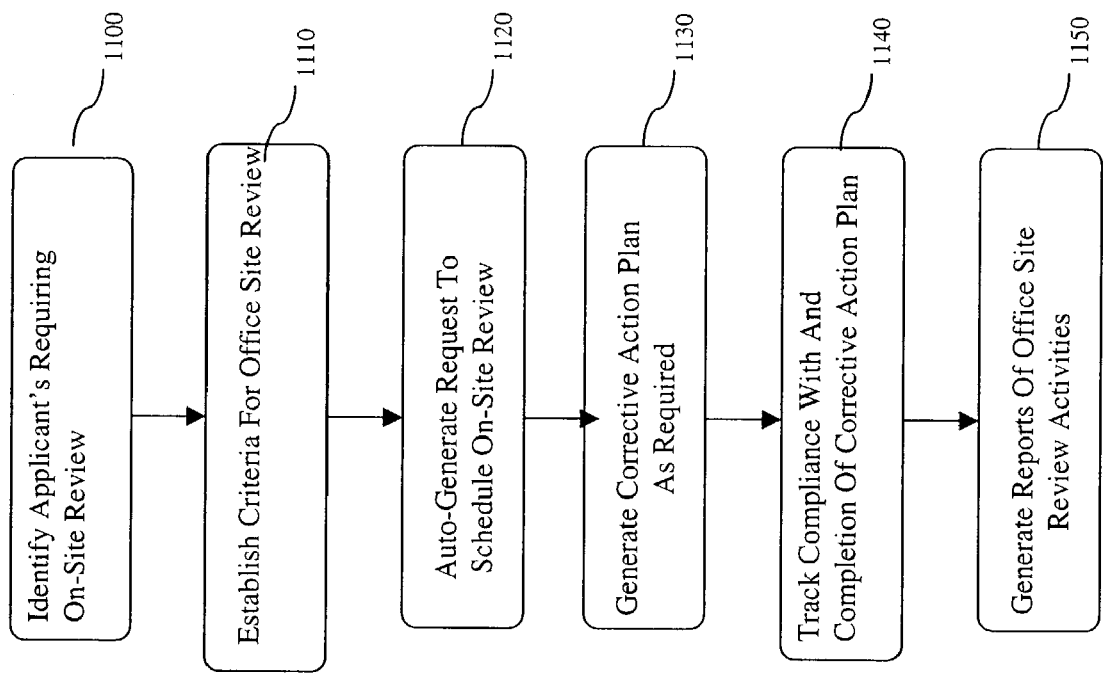
FIG. 10 graphically illustrates a process for reviewing select practitioner office sites in accordance with an exemplary embodiment of the present invention.

Referring to FIG. 10, an exemplary embodiment of the present invention may also allow for the review of select practitioner office sites. For example, in one embodiment an exemplary system may identify practitioners requiring office site review to satisfy the regulatory requirements, etc 1100. The system may then establish the criteria for the on-site review in accordance with the requirements for regulatory compliance 1100. The system may then auto-generate a request to schedule an on-site review 1120, generate review results and generate a corrective action plan, if required as a result of the review 1130. An exemplary system may track compliance with and completion of the corrective action plans 1140 and generate a report of the office site review activities 1150.

The invention described herein will itself suggest to those skilled in the various arts, alternative embodiments and solutions to other tasks and adaptations for other applications. It is the applicants' intention to cover by claims all such uses of the invention and those changes and modifications that could be made to the embodiments of the invention herein chosen for the purpose of disclosure without departing from the spirit and scope of the invention.

What is claimed is:

1. A method for electronically verifying information pertaining to applicants over a communication network including a plurality of computing devices, the method comprising:
    collecting credentials information pertaining to applicants in one or more of a plurality of formats;
    converting credentials information in one or more of the plurality of formats into a common format of collected credentials information;
    storing the collected credentials information in a dynamic relational database; and
    verifying concurrently for a plurality of applicants the collected credentials information with external sources through an electronic interface, wherein the verifying further comprises:
        automatically obtaining third party credentials data wherein the obtaining comprises querying automatically on a periodic basis third party databases having third party credentials data relating to the collected credentials information; and
        automatically electronically comparing the obtained third party credentials data to the collected credentials information pertaining to the applicant;
    automatically electronically updating the relational database with the retrieved data;
    automatically electronically notifying a user of inconsistencies between the obtained third party credentials data and the collected credentials information pertaining to the applicant; and providing selective electronic access to the updated third party credentials information over the communication network to one or more users and to the applicant to which the third party credentialing information pertains.

2. The method of claim 1 further comprising creating and maintaining a re-verification calendar of said credentials information.

3. The method of claim 1 further comprising identifying adverse information or errors in verification of credentials information.

4. The method of claim 1 further comprising auditing credentials information.

5. The method of claim 1 further comprising generating user-defined reports on credentials information.

6. The method of claim 1 further comprising generating accounting records associated with the verification of credentials information.

7. The method of claim 1 wherein collecting credentials information in a plurality of formats comprises:
   creating an applicant record for data storage;
   contacting the applicant via email, fax, letter or a combination thereof; and
   providing the applicant with reminder renewals for expiring credentials information.

8. The method of claim 1 wherein collecting credentials information comprises collecting responses over the Internet.

9. The method of claim 1 wherein collecting credentials information comprises collecting response information stored on a storage media.

10. The method of claim 1 wherein collecting credentials information comprises importing teleform data.

11. The method of claim 1 wherein collecting credentials information comprises continually requesting credentials information from the applicant via email, fax, letter or a combination thereof until all of the requested credentials information is collected.

12. The method of claim 1 further comprising authenticating the credentials information with an electronic or scanned signature.

13. The method of claim 12 wherein authenticating the credentials information with an electronic signature or scanned signature comprises:
   assigning a Global Unique Identification (GUID) upon login; and
   capturing the scanned signature from a paper document.

14. The method of claim 1 wherein storing collected credentials information in a dynamic database comprises:
   time-stamping collected credentials information;
   comparing existing credentials information to newly entered credentials information; and
   archiving existing credentials information to a history table.

15. The method of claim 1 further comprising creating client specific dynamic template in accordance with extensible markup language specification and mapping stored credentials information into dynamic template.

16. The method of claim 1 wherein verifying collected credentials information with external sources further comprises:
   auto-generating verification requests to non-electronic sources; and
   receiving verification information from non-electronic sources and storing as scanned images.

17. The method of claim 16 wherein verifying collected credentials information with external sources further comprises:
   comparing verification information with credentials information submitted by the practitioner;
   auto-updating the database with matched information;
   manually updating the database through the use of electronic work ticklers; and
   providing real-time notification of adverse information.

18. The method of claim 3 wherein identifying adverse information or errors in verification of credentials information comprises:
   requesting explanations for adverse information or errors from the practitioner; and
   re-verifying the credentials information, if warranted.

19. The method of claim 4 wherein auditing credentials information comprises:
   (a) performing two consecutive audits of verified credentials information;
   (b) performing a quality audit of selected credentials information if each of the two consecutive audits is passed; and
   (c) repeating steps (a) and (b) if either of the two consecutive audits is not passed or if the quality audit is not passed.

20. The method of claim 1 further comprising:
   generating a list of a plurality of privileges;
   establishing criteria for granting said plurality of privileges;
   allowing practitioner to select privileges for which he is qualified;
   generating delineation of privileges forms from selected privileges;
   and auto-sending such delineation of privileges forms to external sources for verification of competence.

21. The method of claim 1 further comprising:
   identifying applicants requiring office site review;
   performing data entry of office site review results;
   generating corrective action plans if required;
   tracking completion of corrective action plans; and
   generating reports of office site review activities.

22. The method of claim 1 further comprising:
   generating a profile of verified credentials information required by regulatory agencies;
   notifying affiliated organizations that the credentials information has been verified or re-verified and is complete; and
   providing a hyperlink for download of the profile and all copies of electronic and scanned documents utilized in the verification process.

23. An electronic credentials verification system, comprising:
   means for requesting credentials information pertaining to applicants in one or more of a plurality of formats;
   means for collecting credentials information pertaining to the applicants through an interface to a communication network;
   means for storing collected credentials information in a dynamic database; and
   means for automatically verifying collected credentials information with external sources through an electronic interface, wherein the means for verifying comprises:
      means for automatically obtaining third party credentials data, wherein the means for automatically obtaining comprises means for querying automatically on a periodic basis third party databases having third party credentials data relating to the collected credentials information; and means for automatically electronically comparing the obtained third party credentials data to the collected credentials information pertaining to the applicant;

means for automatically electronically updating the dynamic database with the retrieved data and images means for automatically electronically notifying a user of inconsistencies between the obtained third party credentials data and the collected credentials information pertaining to the applicant; and means for automatically presenting the user with the updated third party credentialing information.

24. The electronic verification system of claim 23 further comprising means for allowing for selection of privileges based upon analysis of credentials information.

25. The electronic verification system of claim 23 further comprising means for reviewing office sites of select applicants.

26. The electronic verification system of claim 23 further comprising means for generating verified credentials profile information including copies of records from external sources.

27. The electronic verification system of claim 23 further comprising means for creating and maintaining a calendar of re-verification of an applicant's credentials.

28. The electronic verification system of claim 23 further comprising means for generating client specific dynamic credentials application templates with the stored credentials information.

29. The method of claim 1 further comprising providing the applicants a means to comment on the inconsistencies between the obtained third party credentials data and the collected credentials information pertaining to the applicant.

30. The electronic verification system of claim 23 further comprising means for commenting on the inconsistencies between the obtained third party credentials data and the collected credentials information pertaining to the applicant.

31. The method of claim 1 wherein the providing selective electronic access comprises making one or more images of primary source data pertinent to the presented information available through download or hyperlink.

32. The method of claim 1 wherein the means for presenting comprises means for making one or more images of primary source data pertinent to the presented information available through download for hyperlink.

33. The electronic verification system of claim 23 wherein the means for presenting comprises means for making one or more images of primary source data pertinent to the presented information.

34. The method of claim 1 wherein the means for presenting comprises means for presenting one or more images of primary source data pertinent to the presented information.

35. The method of claim 1 wherein the querying automatically on a periodic basis third party databases having third party credentials data relating to the collected credentials information comprises continuously querying the third party databases.

36. The electronic verification system of claim 23 wherein the means for querying automatically on a periodic basis third party databases having third party credentials data relating to the collected credentials information comprises means for continuously querying the third party databases.

\* \* \* \* \*